United States Patent [19]
Trelease

[11] 3,981,689
[45] Sept. 21, 1976

[54] INSULATOR

[75] Inventor: Robert B. Trelease, Torrance, Calif.

[73] Assignee: Hitco, Irvine, Calif.

[22] Filed: Oct. 15, 1974

[21] Appl. No.: 514,386

[52] U.S. Cl. ................................ 29/183; 138/147; 138/148; 165/135
[51] Int. Cl.² ................ B32B 3/00; F16L 59/14; F28F 13/00
[58] Field of Search ............. 165/135, 136, 166 US; 138/147, 148, 149; 29/191, 183.5; 52/618; 428/36, 183, 182 US, 184 US, 185 US, 186 US

[56] References Cited
UNITED STATES PATENTS

| | | | |
|---|---|---|---|
| 1,751,757 | 3/1930 | Phillips | 165/166 |
| 1,987,798 | 1/1935 | Ruppricht | 428/186 X |
| 2,179,057 | 11/1939 | Schuetz | 138/148 X |
| 2,596,642 | 5/1952 | Boestad | 165/166 |
| 2,613,166 | 10/1952 | Gronemeyer | 156/304 X |
| 2,789,322 | 4/1957 | Coss | 52/618 X |
| 3,372,743 | 3/1968 | Pall et al. | 165/166 |
| 3,412,518 | 11/1968 | Waite | 52/618 X |
| 3,421,977 | 1/1969 | Hutchinson et al. | 29/191 X |
| 3,528,495 | 9/1970 | Armstrong et al. | 165/135 |
| 3,698,879 | 10/1972 | Gewiss | 29/191 |

FOREIGN PATENTS OR APPLICATIONS

| | | | |
|---|---|---|---|
| 482,747 | 4/1938 | United Kingdom | 428/183 |

*Primary Examiner*—L. Dewayne Rutledge
*Assistant Examiner*—E. L. Weise
*Attorney, Agent, or Firm*—Fraser and Bogucki

[57] ABSTRACT

Readily installable, highly efficient insulating structures for affixation to bodies requiring insulation comprise successive sheets of closely spaced heat resistive metal foil configured to maintain the intersheet spacing under the stress of gravity and other external forces. Each sheet of foil includes a plurality of corrugations which extend through part but not all of the gaps between adjacent sheets to minimize convection, and which in one embodiment abut corrugations of adjacent sheets to maintain the intersheet spacing. In one embodiment the corrugations are V-shaped in cross section and extend along the length of the sheet on one side thereof. In a different embodiment, each corrugation is comprised of a series of protrusions in the sheet which extend end-to-end along the length of the corrugation, the protrusions alternating in direction along the length of the corrugation to form a zig zag pattern and alternately extending outwardly on opposite sides of the sheet and into abutment with protrusions from adjacent sheets. The insulating structure is contained within a sealed envelope to minimize oxidation of the sheet as well as to prevent contamination of the insulator from outside sources.

21 Claims, 10 Drawing Figures

INSULATOR

BACKGROUND OF THE INVENTION

1. Field of the Invention

The invention concerns insulators installable upon structures for thermal insulation thereof.

2. Description of the Prior Art

The growth of industry and technology has resulted in a substantial and increasing need for devices which can be installed upon structures, such as pipes in steam plants or nuclear reactors, to insulate such structures thermally from their environment. The recognized need for such devices has become increasingly critical through growing awareness of the impending energy crisis as well as the danger to the environment posed by thermal pollution and by pollution from deterioration under use of existing insulation materials such as asbestos. Existing devices such as those depicted in the patent to Gronemeyer, U.S. Pat. No. 2,613,166, have proved adequate in several respects to meet the need for such installable insulation. The devices have sufficient structural integrity for certain purposes, and insulate sufficiently well for some purposes. The devices, however, suffer several drawbacks. The most important is that their insulative ability is hampered by their failure to prevent convective transfer of heat, an important element in insulation efficiency. Moreover, at somewhat elevated temperatures and under conditions wherein somewhat substantial external stresses, including those due to gravitational forces, are applied, such structures tend to deform with resulting contact between insulating layers and a critical breakdown of insulating capability. To promote structural integrity such devices have had to incorporate materials, such as sheet reinforced steel, which add substantial weight and have other undesirable properties. Stainless steel, for example, oxidizes at elevated temperatures and unless maintained by buffing as a bright surface decreases significantly in thermal reflectivity. Furthermore, fabrication of such devices is hampered and rendered inaccurate by the tendency of the insulating sheets comprising the devices to bend or dent as a consequence of handling during the fabrication process. Such bending or denting, of course, results in irregularity of spacing between successive insulating layers and undesirable diminution of insulation efficiency.

Consequently, there has been a recognized but unfulfilled need for installable insulating structures which would have high efficiency due to prevention of convective transfer of heat and would exhibit structural integrity under a wide range of conditions of temperature and other stress.

Summary of the Invention

Insulator arrangements are provided comprising a plurality of very closely-spaced thin sheets or foil layers of heat resistive material, which define patterns of corrugations and provide structural integrity against gravitational and other stresses and are configured so that they may readily enclose objects to be isolated from the environment. In one particular embodiment, a generally cylindrically-shaped insulator comprises a plurality of substantially concentric, cylindrical metallic sheets having corrugations directed substantially parallel to the axis of the cylinder and having cross corrugations or cross-crimps defined substantially transversely to the corrugations along the length thereof. Interlayer spacing may be small enough to prevent convective heat transfer substantially entirely, in which case the corrugations may be relatively shallow. In embodiments having somewhat greater spacing the corrugations may be relatively deep or doubled and may extend further into the intersheet space to act as baffles, minimizing convection. The corrugations are spaced at a distance less than the interjoint distance of the average human finger to minimize the possibility of denting of the sheets due to manual manipulation. The sheets comprise substantially identical sets of the half cylindrical shape fittable readily together to define an interior insulated volume. Each set of sheets is enclosed within a sealed envelope of half cylindrical shape and made of thin sheets of metal.

Spacers may be disposed in the cross-crimps to maintain interlayer spacing and to act as baffles against convective circulation which might otherwise result, especially in the situation in which the insulator is disposed upon a vertical conduit or other object to be insulated.

In an alternative embodiment the corrugations alternate in their directions relative to the plane of the sheet so as to form a plurality of separate protrusions which themselves alternate in direction so as to form a zig-zag pattern across the surface of the sheet. The resulting arrangement renders the sheet highly resistant to distortion or adverse bending due to weight, stress or handling. In addition the protrusions from adjacent sheets abut each other to maintain a nominal intersheet spacing. Where desired the lateral spacing between corrugations on each of the sheets may be varied so that the corrugations of some or all of the sheets align radially when the sheets are disposed in a semicircular configuration. Alternatively the corrugations of each sheet can be spaced relatively close together so that when adjacent sheets are stacked together a number of pairs of contacting protrusions are formed sufficient to maintain nominal intersheet spacing.

DETAILED DESCRIPTION OF THE INVENTION

Figure 1:
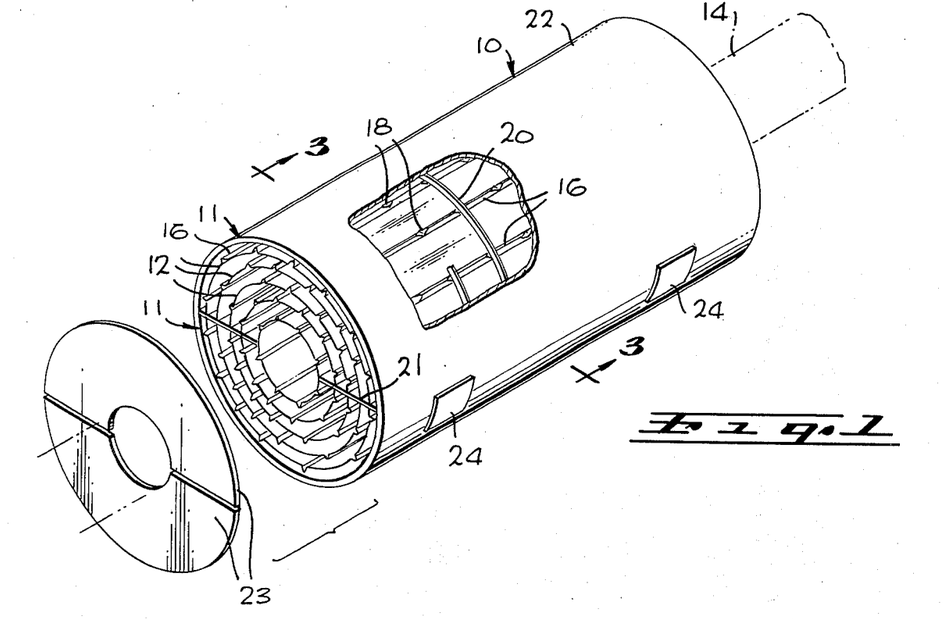
FIG. 1 is an exploded perspective view, partly broken away, of an insulating arrangement in accordance with the invention.
Figure 2:
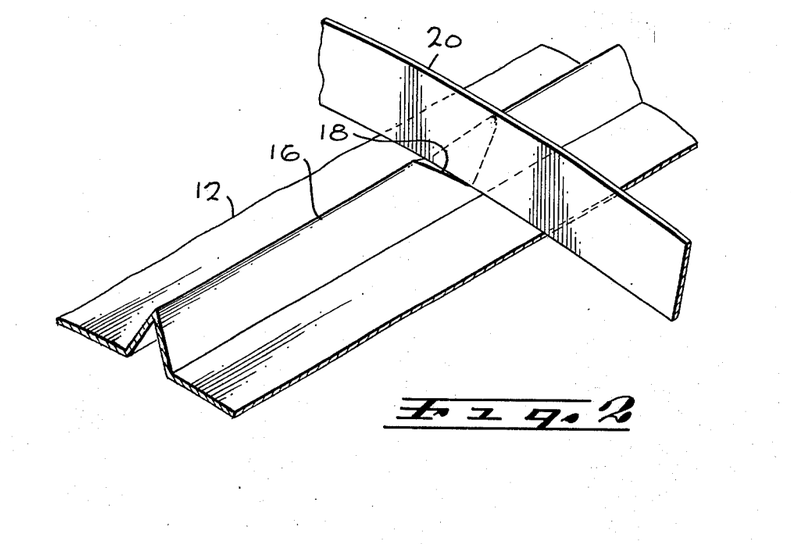
FIG. 2 is a perspective, enlarged view of a fragment of the insulation arrangement of FIG. 1.
Figure 3:
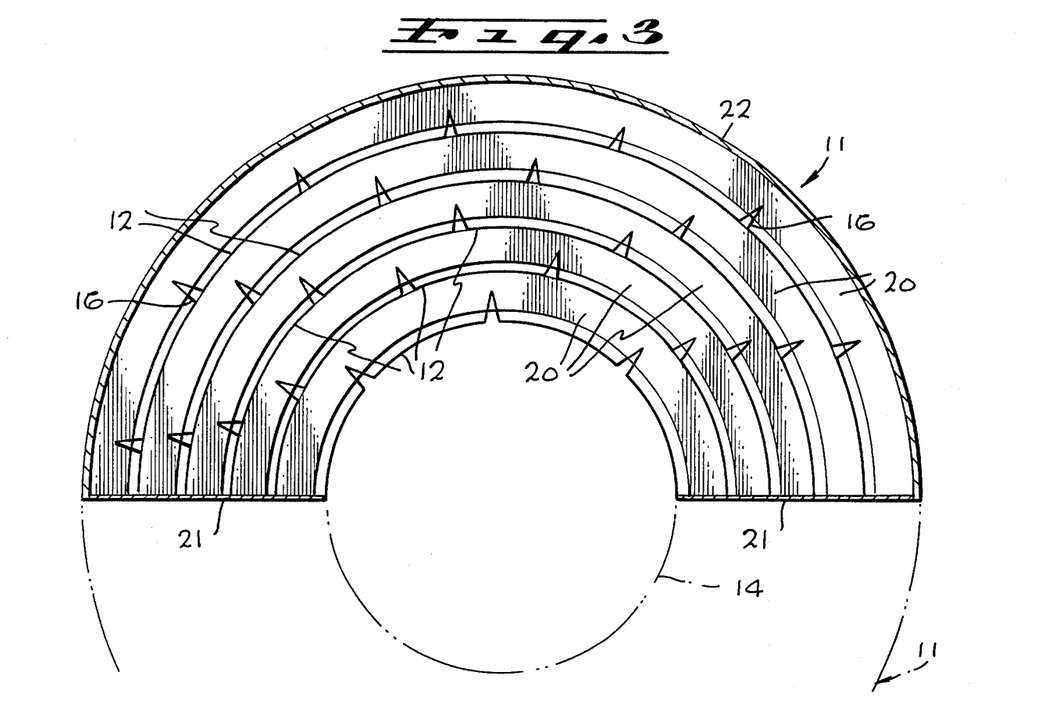
FIG. 3 is a cross-sectional view of the insulating arrangement of FIG. 1, taken along the line 3—3 of FIG. 1.

An installable insulator 10 comprises a pair of half-sections 11, each of which comprises a plurality of nominally parallel, generally planar, spaced-apart sheets or layers 12 of heat-resistive material, such as metallic foil, as shown in FIGS. 1–3. The half-sections 11 are fittable togethe to close over and insulate a pipe 14. The sheets are depicted as having a generally semi-cylindrical shape. The contour is, of course, exemplary only, and other contours are possible in accordance with the invention.

Ridges, folds, or corrugations 16 defined by each of the layers 12 produce structural integrity and maintain the circularity of the cross-section against the stress from the layer's own weight. The corrugations 16 have a V-shaped cross-section, resembling a triangle open on one side, and are directed generally parallel to the axis of the insulator 10, which is of a substantially cylindrical configuration. Other corrugation cross-sectional shapes and insulation configurations, of course, are also possible in accordance with the invention. The corrugations 16 are preferably spaced sufficiently densely to prevent denting due to manual manipulation in manufacturing or use of the invention. This spacing should be such that the fingers of the average person handling the device would contact only the ridges and not the inter-ridge portions of each sheet 12.

The relative disposition of the corrugations 16 as between different sheets 12, primarily a matter of manufacturer's convenience, is shown here as alternating in the sense that corrugations in every other sheet 12 tend to be aligned substantially with respect to a radial line. Series of cross corrugations or cross-crimps 18 are defined by the sheets 12 along the corrugations 16. The cross-crimps 18 tend to prevent the corrugations 16 from flattening and thus lend rigidity to the entire structure. The cross corrugations 18 are shown as generally wedge-shaped but may be different contours as manufacturing or other considerations dictate. As depicted in FIG. 3, for additional rigidity spacers 20 may be disposed between the cross corrugations 18 and the underside of the adjoining sheets 12 to maintain intersheet spacing. The spacers 20 preferably comprise thin strips of rigid metal and may be held in place through spot welding or other conventional means.

The intersheet distance is preferably maintained at approximately ⅛ inch or less, and in any event must be something substantially less than the nominal ½ inch figure commonly used in prior art structures. Intersheet spacing has been found to be of substantial significance, particularly in terms of minimizing or preventing convection. The invention applies the principles of thermodynamics and hydrodynamics substantially to eliminate convection by employing the intersheet spacing cited and smaller spacings. Elimination of convection at such spacings is essentially due to the viscosity of air which precludes convective flow at the spacing referred to. At greater spacings, as in existing devices, convection will take place and substantially reduce insulation efficiency, in the absence of other means for diminishing the effects of convection. Thus, insulation in accordance with the invention eliminates a source of significant inefficiency present in existing insulators. The corrugations 16, besides their structural importance, also perform the function of acting as baffles against circumferential convection. The spacers 20 act as baffles against longitudinal convection, which is particularly useful in situations in which the pipe or conduit which is to be isolated by the insulator is in a vertical direction and thus would produce air flow and accompanying convection in that direction.

The invention also applies thermodynamic principles relating to heat transfer by conduction. Net heat transfer by radiation over a series of radiators diminishes with an increase in the number of radiators within a given distance transversed by the radiation. Thus, the close spacing permitted by the structural integrity of insulators in accordance with the invention not only permits greatly increased efficiency of insulation with respect to convective heat transfer but also with respect to radiative heat transfer. In a typical example a shown in the following table, an insulator in accordance with the invention having 1/5 inch intersheet spacing exhibited thermal conductivity characteristics approximately twice as favorable as those exhibited by a prior art device of the same material and dimensions and having approximately ½ inch intersheet spacing, at typical operating temperatures. The same device in accordance with the invention had approximately half the heat loss of and a substantially lower surface temperature than the prior art device, under typical operating conditions.

| Intersheet Spacing (Inches) | | Thermal Conductivity $\left(\frac{BTU - in.}{hr., sq.ft.,°F}\right)$ | Surface Temperatures (°F) | Heat Loss (BTU/ft²-hr.) |
| --- | --- | --- | --- | --- |
| Thermal insulator in accordance with the invention (Steel, 12 inch outer diameter, 4.40 inch inner diameter | 1/5 | .55 (at 400°F) .65 (at 550°F) | 156 (at 900°F temperature of insulated object) | 232 (at 900°F temperature of insulated object) |
| Prior art device (Steel, 12 inch outer diameter, 4.40 inch inner diameter) | 1/2 | 1.05 (at 400°F) 1.30 (at 550°F) | 216 (at 900°F temperature of insulated object) | 430 (at 900°F temperature of insulated object |

Further illustrations of the superior efficiency of insulators in accordance with the invention as compared with previously existing devices are graphically set out in FIG. 6, discussed in detail below.

The various layers 12 are preferably sealed within an envelope for several reasons. First of all, it has been found that oxidation of the reflective metal foil typically used for the layers 12 is greatly minimized if the layers 12 are sealed against further exposure to oxygen. As the initial quantity of oxygen in the air surrounding the layers 12 is used up upon subjecting the insulator to heat, sealing of the envelope surrounding the layers 12 prevents further oxidation of the layers 12. It has been found that the layers 12 oxidize very rapidly at high temperatures, and that the resultant oxidation significantly increases the emissivity of the layers 12, adversely affecting the performance of the insulator. It may be desirable to fill the insulator with an inert gas such as nitrogen, or a reducing gas such as that used in bright annealing of stainless steel. Both such gases minimize oxidation of the layers 12. If principally carbon dioxide is used, an additional improvement in insulation efficiency results due to the approximately 25% lower thermal conductivity when compared to air. It is also desirable to mount the layers 12 within a sealed envelope to prevent their contamination such as by water in the event of flooding in the region of the insulator and entrapment of contaminants within the gap between contacting sheets which are riveted or spot-welded together as in current insulations.

In the arrangement of FIG. 1 the layers 12 are sealed by closure means comprising a flange 21. A cover 22 and end pieces 23 enclose the sheets 12 of each half section 11 of the insulator 10. The cover 22 is affixed by frictional engagement with the flange 21. The cover half sections are joined in a conventional manner as by hinges 24 joining the covers 22 and are readily closeable against each other to form a seal upon application of sealer means such as insulating tape or through use of other sealing means. Alternatively, the half sections 11 may be separate and sealed to each other during installation.

Figure 4:
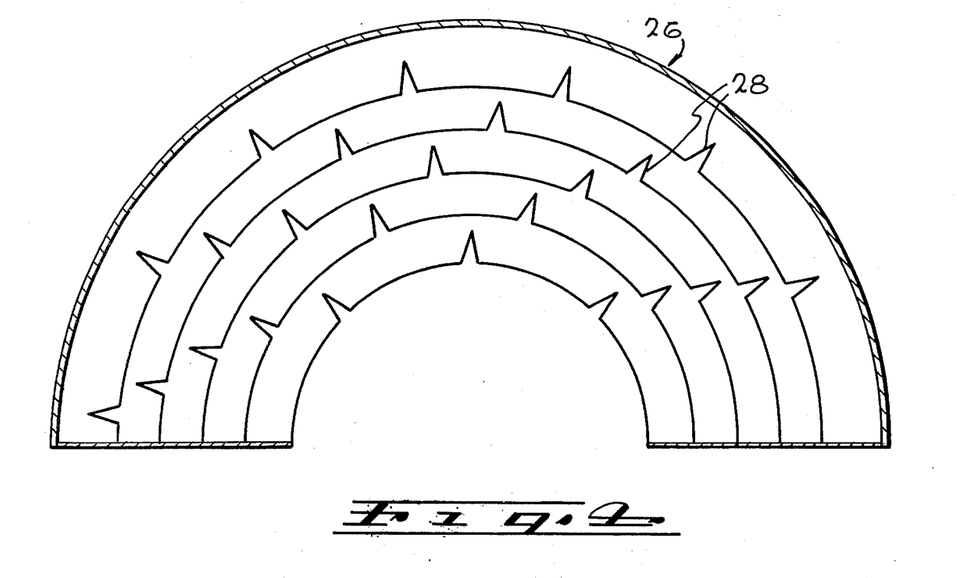
FIG. 4 is a cross-sectional view of a half-section of an insulating arrangement in accordance with the invention having an alternative corrugation configuration.

FIG. 4 depicts an insulator 26 in accordance with the invention having an alternative configuration of corrugations 28 and alternative intersheet spacing. As a comparison of FIGS. 3 and 4 indicates, the interlayer spacing and the depth of the folds are greater in the embodiment of FIG. 4. This alternative is particularly appropriate for use in situations where economic considerations dictate that thermal insulators with fewer sheets per inch be used and thus that there be greater separation between the sheets. In such situations, there is a tendency for convection to occur, since such tendency increases with the distance between sheets. The peaks of the corrugations 28 of the insulator 26 depicted in FIG. 4 extend more than half the intersheet distance and act as baffles reducing convective flow in the circumferential or annular direction.

Figure 5:
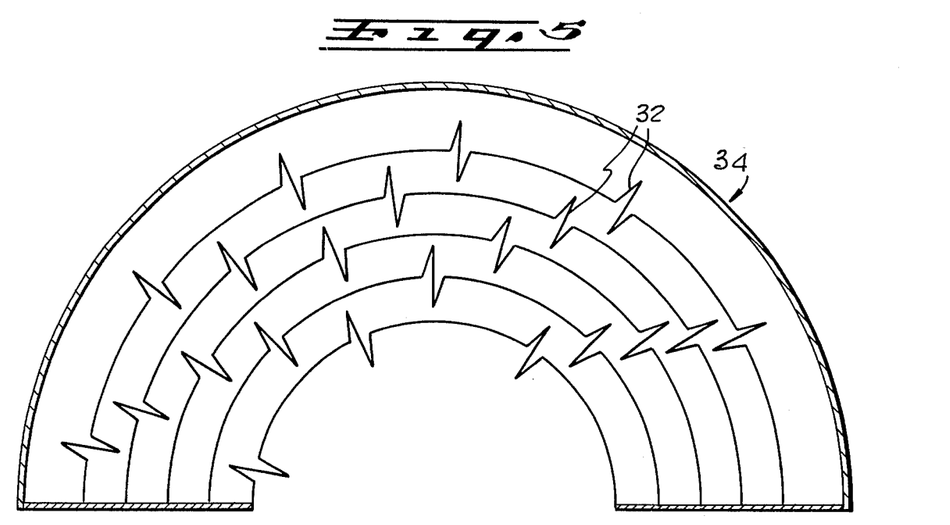
FIG. 5 is a cross-sectional view of a half-section of an insulating arrangement in accordance with the invention having another alternative corrugation configuration.

The alternative configuration shown in FIG. 5 is also useful in the cases in which the spacing is not sufficiently small to eliminate convection. Ridges 32 of an insulator 34 comprise double folds and act as baffles to prevent convective flow in the circumferential direction.

Figure 6:
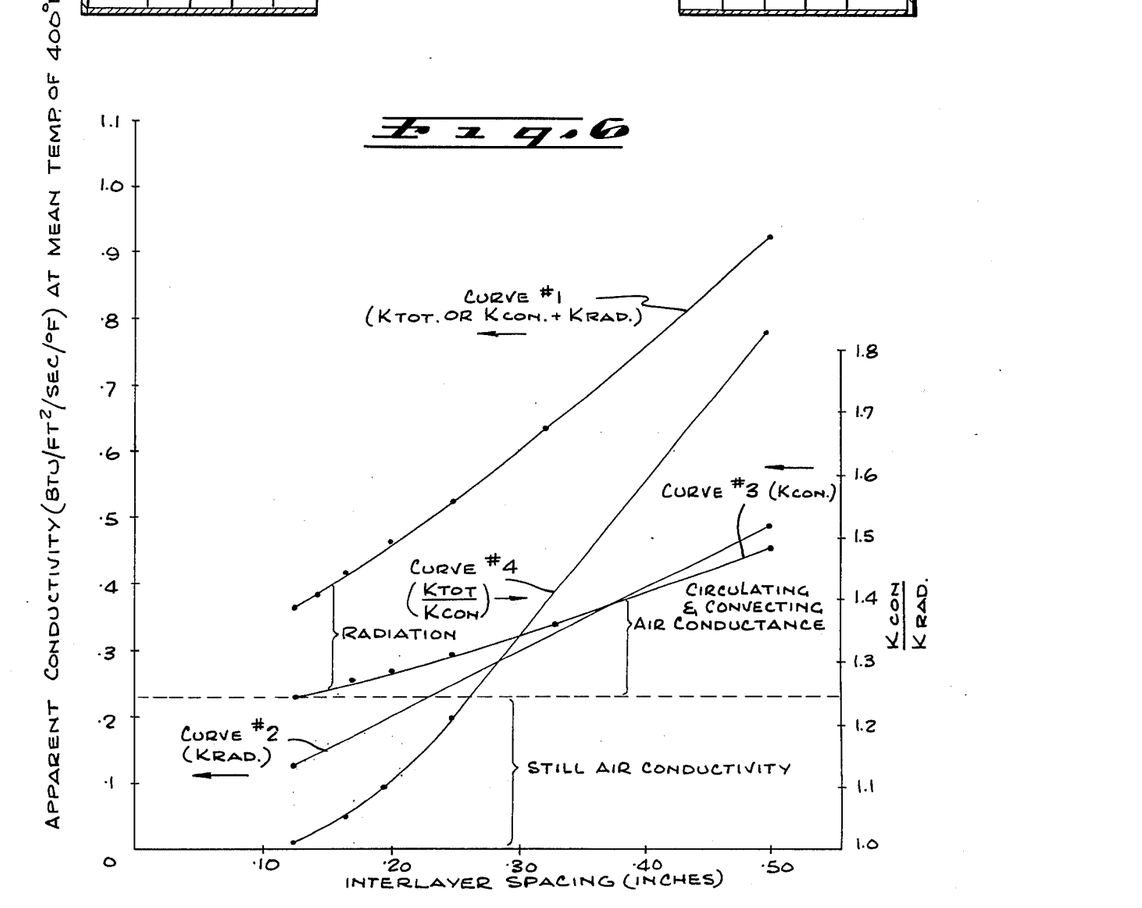
FIG. 6 is a graphical representation of heat transfer as related to the spacing of successive layers of multi-layered insulation arrangements.

FIG. 6 graphically illustrates the advantages over previously existing devices of insulators in accordance with the invention. FIG. 6 represents data which was determined on insulators in accordance with the invention in which the relationship of conductivity to interlayer spacing was determined. The abscissa represents interlayer spacing (in inches), the (left) ordinate, thermal conductivity and the (right) ordinate, pure numbers. Curve No. 1 represents total conductivity, $k_{tot}$, comprising the sum of combined convective and conductive conductivity, $k_{con}$, and radiative conductivity, $k_{rad}$, and refers to the left ordinate scale as indicated by an arrow. Curve No. 2 represents $k_{rad}$ and Curve No. 3, $k_{con}$. Curves 2 and 3 refer to the left ordinate scale as denoted by arrows. Curve No. 4 represents the ratio, $k_{tot}/k_{con}$, of the total conductivity of combined convective and conductive conductivity and refers to the right ordinate scale as indicated by an arrow. The dotted line across FIG. 6 separates the still air conductivity from conductivity due to circulation, convection and radiation. It will be noted that significant convection beings to occur at about 0.125 inch spacing. The convection becomes increasingly larger with increased interlayer spacing beyond this point.

Thus, the advantages of the present invention are clear. Because of the close spacing of successive insulation layers in accordance with the invention, ⅛ to 1/5 inch in typical cases, the conductivity of such insulators is substantially lower than that of existing insulating devices, where interlayer spacing is on the order of ½ inch or more.

Figure 7:
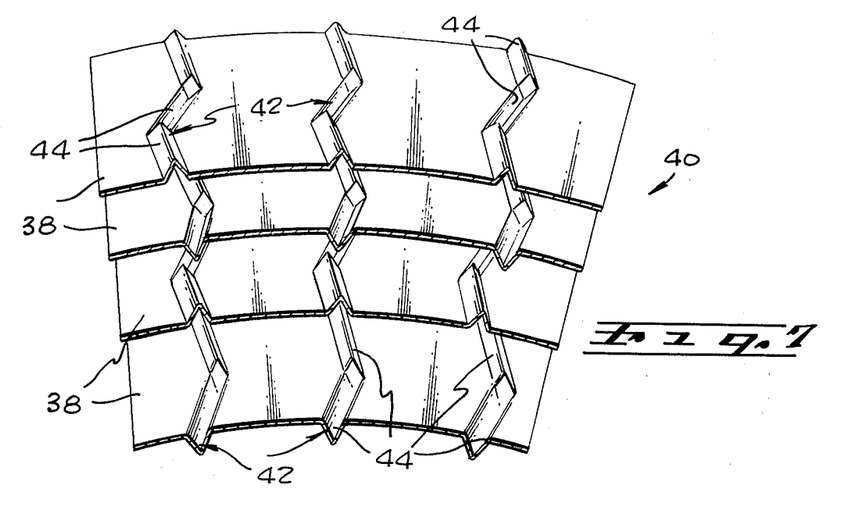
FIG. 7 is a perspective, exploded view of a portion of an insulation arrangement in accordance with the invention having still another alternative corrugation configuration.
Figure 8:
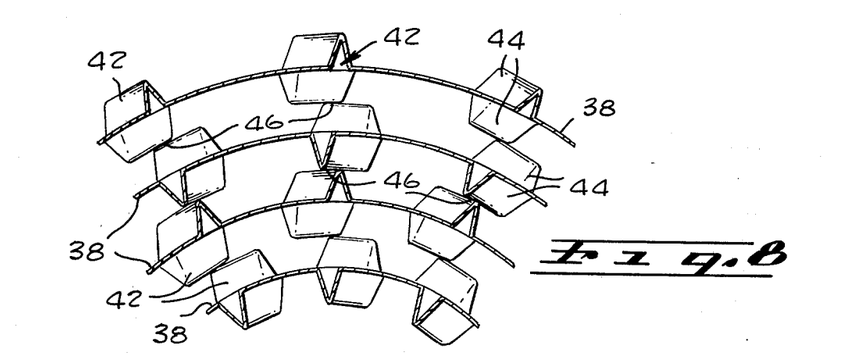
FIG. 8 is a front view of an insulation arrangement of the type shown in FIG. 7 and illustrating the manner in which the corrugations can be radially aligned in a circular configuration.
Figure 9:
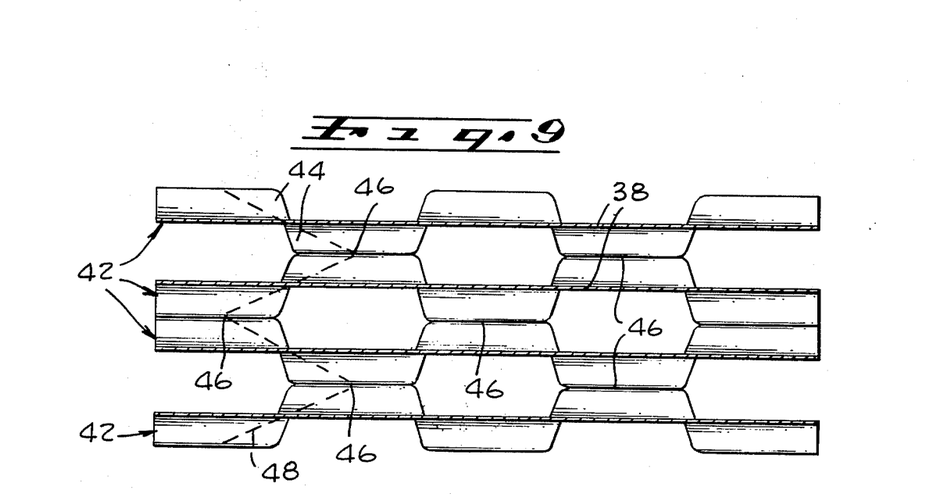
FIG. 9 is a side view of an insulation arrangement of the type shown in FIG. 7.

FIGS. 7, 8 and 9 depict portions of insulators in which the sheets have corrugations assuming a still different arrangement in accordance with the invention. As seen in FIG. 7 each of a plurality of nominally parallel, generally planar, spaced-apart sheets 38 comprising an insulator 40 has a series of longitudinal corrugations 42 extending along the length thereof in generally parallel relationship to one another. Each of the corrugations 42 comprises a series of protrusions 44 arranged end-to-end in the sheet 38. The protrusions 44 which are of generally uniform length and V-shaped cross section are of alternating sense in that they alternately extend in opposite directions from the general plane of the sheets 38. The protrusions 44 also alternate in direction along the lengths of the corrugations 42 to define a zig-zag pattern or wave.

The particular arrangement of corrugations shown in FIGS. 7, 8 and 9 has been found to provide the individual sheets 38 with substantial strength and rigidity. The alternating senses of the individual protrusions 44 and their alternating directions combine to resist excessive or otherwise adverse distortion, bending or folding of the sheets 38. In particular the individual sheets 38 cannot be distorted to any substantial extent in directions perpendicular to the direction of the corrugations 42, which is not true of most sheets having other corrugation arrangements. Such arrangement furthermore makes the sheets highly resistive to the adverse effects of manual handling as well as weight and other stresses when the sheets are stacked together in an insulation arrangement. The individual protrusions 44 which are typically formed as by pressing from the plane of the sheet are rigid along their entire length and are not prone to flattening or denting when contacted by other protrusions.

The corrugations 42 of the various sheets 38 are formed such that the corrugations of each adjacent pair of sheets are of opposite phase in terms of both the direction of the individual protrusions 44 along the sheets and their sense relative to the planes of the sheets. Thus, as viewed in plan to zig zag patterns of adjacent corrugations in an adjacent pair of the sheets 38 define triangular waves which as superimposed on one another form a symmetrical pattern in which the legs of the waves as defined by the individual protrusions 44 interact each other at their approximate midpoints. The points of intersection define the points of contact between adjacent sheets 38. As viewed from the side (FIG. 9) the alternating senses of the protrusions 44 relative to the plane of each sheet define alternating waves relative to the plane of the sheet. The alternating waves of adjacent sheets are out of phase so that the wave troughs of a given sheet contact the wave crests of the adjacent sheet on one side thereof and the wave crests of the given sheet contact the wave troughs of the adjacent sheet on the other side thereof.

The result is that alternate protrusions in each corrugation 42 engage the corresponding protrusions from adjacent sheets to form pairs of mating protrusions which support the stack of sheets while maintaining a nominal intersheet spacing. Such mating abutment of the various protrusions not only eliminates the need for spacers 20 or similar elements of the type shown in FIG. 2 but greatly reduces or minimizes convective heat flow.

As shown in FIG. 8, the lateral spacing between adjacent corrugations 42 among the various sheets 38 may be varied in arrangements where the sheets 38 assume a curved or circular configuration so that the corrugations 42 of the various sheets 38 are generally radially aligned with respect to the center of the configuration. As seen in FIG. 8 the corrugations 42 within the top sheet are spaced further from one another than are the corrugations in the sheet thereunder, and so on. While such arrangement requires a different corrugation spacing for each sheet 38, it insures contact of the protrusions 44 in substantially all areas of the structure to enhance overall strength and maintenance of a uniform interlayer spacing.

Alternatively each of the sheets 38 may be provided with a sufficient number of the corrugations 42 so that when adjacent sheets are stacked together a sufficient number of pairs of mating or abutting protrusions are formed to provide the necessary support and intersheet spacing.

As seen in FIG. 9 as well as in FIG. 8 the abutting pairs of the protrusions 44 from adjacent sheets 38 contact each other at points 46. Such areas of contact are points rather than lines since the individual protrusions 44 of each abutting pair extend in different directions due to the out-of-phase character of adjacent corrugations. Because of the strength and rigidity of the individual protrusions 44 as well as of the sheets 38 themselves, a point contact of very small area is more than adequate to provide needed strength and sturdiness while maintaining interlayer spacing. The point contacts, moreover, make possible a minimum heat conduction through the insulators 40. Thus as seen in FIG. 9 the paths of heat conduction through the insulator 40 necessarily include the points 46 and are therefore tortuous. One such path 48 is shown as a dotted line in FIG. 9. It will be appreciated that the tortuousness of such conduction paths as well as the limitations in their areas imposed by the points 46 work to greatly minimize heat conduction in such structures.

The effectiveness of structures in accordance with the invention such as those of FIG. 7–9 in terms of strength and insulation performance which is illustrated by the following date derived from tests:

|  | Intersheet | | Heat loss at an allowable heat leak of 80 $\frac{BTU}{ft^2}$ |
|  | Spacing Inches | Weight (Pounds) |  |
| --- | --- | --- | --- |
| Prior art device of given size | 1/2 | 8.3 | 308.6 $\frac{BTU}{ft.\ of\ ducting}$ |
| Device according to the invention and of the same size | 1/5 | 4.1 | 207.7 $\frac{BTU}{ft.\ of\ ducting}$ |

-continued

|  | Intersheet | | Heat loss at an allowable heat leak of 80 $\frac{BTU}{ft^2}$ |
|  | Spacing Inches | Weight (Pounds) |  |
| --- | --- | --- | --- |
| Device according to the invention and of the same size | 1/8 | 3.9 | 172.1 $\frac{BTU}{ft.\ of\ ducting}$ |

Sheets used in structures according to the invention can be made relatively thin due to their superior strength and rigidity as well as the relatively small intersheet spacing. Thus for insulating structures of given size, the total weight reduces sharply in the case of the invention as contrasted with other devices using a larger intersheet spacing as shown by the above data. Moreover the heat loss for given leakage conditions is sharply reduced in the case of cylindrical structures according to the invention, as shown by the data.

Figure 10:
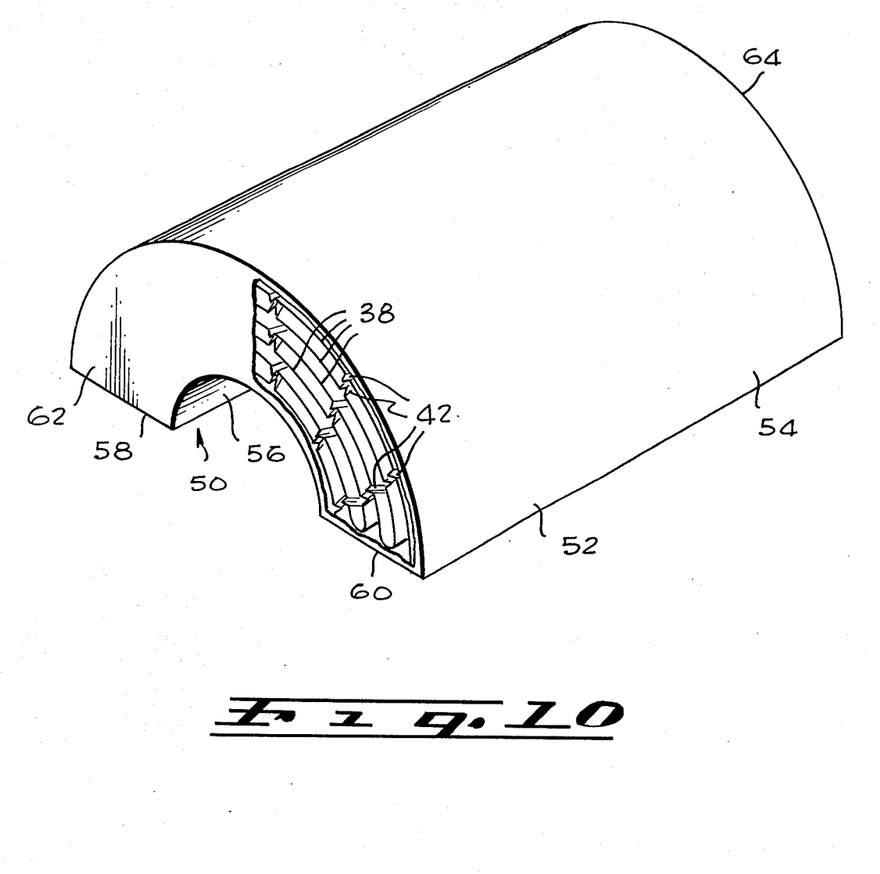
FIG. 10 is a perspective view of a semi-cylindrical insulator employing an insulation arrangement of the type shown in FIG. 7.

FIG. 10 shows an insulator 50 of semi-circular configuration comprising a portion, in this case one half, of a hollow cylinder. The insulator is comprised of sheets 38 having corrugations 42 arranged as in FIG. 8. In addition a sealed envelope 52 surrounds and encloses the sheets 38. The envelope 52 is comprised of outer and inner curved surfaces 54 and 56, a pair of edge surfaces 58 and 60, and opposite ends 62 and 64. The various parts 54, 56, 58, 60, 62 and 64, some of which may be combined into a single piece of metal where appropriate, are made of appropriate material such as stainless steel of somewhat greater thickness than the sheets 38 and are joined together at the resulting seams such as by soldering or welding to form the sealed envelope. Because of the uniform density of a plurality of the sheets 38 when stacked together, the sheets 38 can be formed and installed in the envelope 52 and the envelope 52 thereafter sealed without problems arising from later shifting or rearranging of the sheet 38. The sheets 38 remain in place within the envelope 52 despite considerable movement of the sealed envelope, and continue to maintain the nominal intersheet spacing. In the arrangement of FIG. 10 the sheets 38 are comprised of a single continuous sheet which is foled over at the edge of each sheet 38 to form a new adjacent one of the sheets 38. When making the continuous sheet, the length of each of the sheets 38 is calculated in advance so that the intercorrugation spacing can be changed for each new one of the sheets 38 as the protrusions are formed to insure that the various corrugations will align radially when the continuous sheet is folded into the semi-circular configuration of FIG. 10.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An insulator comprising a plurality of generally planar, sheet-like elements disposed in nominally parallel relationship with each other so as to define intersheet gaps between adjacent pairs of the sheet-like elements, each of the sheet-like elements having a plurality of corrugations therein which extend outwardly from the plane of the sheet-like element in at least one direction and through part but not all of the intersheet gap formed by the sheet-like element and an ajacent sheet-like element, the intersheet gaps having a nominal size between the adjacent sheet-like elements of substantially less than one-half inch, each of the corrugations being separated from adjacent corrugations by relatively flat areas of the sheet-like elements substantially larger in area than the area of the corrugations, and means for holding the sheet-like elements apart from one another to maintain the intersheet gaps and to prevent contact between adjacent ones of the sheet-like elements.

2. The invention defined in claim 1, wherein the sheet-like elements comprise thin sheets of reflective metal.

3. The invention defined in claim 1, wherein each of the corrugations comprises a fold of generally V-shaped cross-section in the sheet-like element.

4. The invention defined in claim 1, wherein the intersheet gaps have a nominal size of less than 1/5 inch and the corrugations extend into the intersheet gaps by less than one half the size of the gap.

5. The invention defined in claim 1, wherein the intersheet gaps have a nominal size of more than 1/5 inch and the corrugations extend into the intersheet gaps by more than one half the size of the gap.

6. An insulator comprising a plurality of sheet-like elements arranged in a partial circular configuration, the sheet-like elements being curved around a common axis so as to be concentric with respect to the common axis, the spacing between each adjacent pair of sheet-like elements defining a nominal intersheet gap, each of the sheet-like elements having a plurality of corrugations extending along the length thereof so as to be generally parallel to the common axis, each of the corrugations being separated from adjacent corrugations by relatively flat areas of the sheet-like element substantially larger in area than the area of the corrugations, each of the corrugations of each sheet-like element extending outwardly from the sheet-like element on both sides thereof and into the adjacent intersheet gaps and into contact with corrugations of adjacent sheet-like elements.

7. The invention defined in claim 6, wherein each of the corrugations of each sheet-like element is disposed in a common radial plane with a corrugation from each of the other sheet-like elements, the common radial plane lying within the common axis.

8. The invention defined in claim 7, wherein each of the corrugations comprises a plurality of protrusions in the sheet-like element, the protrusions of each corrugation extending on opposite sides of the sheet-like element and into contact with protrusions of adjacent sheet-like elements on opposite sides thereof, each protrusion of each corrugation in at least some of the sheet-like elements engaging a different protrusion of an adjacent sheet-like element.

9. The invention defined in claim 6, further including a sealed hollow envelope of sheet-like material having the sheet-like elements disposed therein.

10. The invention defined in claim 7, wherein at least some of the sheet-like elements comprise successive portions of a continuous sheet-like element repeatedly folded over itself.

11. An insulator comprising a plurality of generally planar metal sheets disposed in nominally parallel relationship with each other so as to define intersheet air gaps between adjacent pairs of the sheets, each sheet having a plurality of corrugations therein of V-shaped cross-section extending along the length of the sheet in parallel, spaced-apart relation, with each of the corrugations extending through part but not all of the intersheet gap, each corrugation being spaced apart from adjacent corrugations in the same sheet by relatively flat, planar portions of the sheet at least as large in area as the area of the corrugation, each of the corrugations having a plurality of transverse corrugations therein along the length thereof, and a plurality of spacer elements, each being disposed within a transverse corrugation in each corrugation of a given sheet and extending into contact with an adjacent sheet.

12. The invention defined in claim 11, wherein the intersheet air gaps are substantially less than 1/2 inch in size.

13. An insulating arrangement comprising at least one sheet of material having a plurality of generally parallel corrugations therein spaced apart from one another by relatively flat, planar portions of the sheet, each of the corrugations comprising a series of elongated protrusions extending end-to-end along the sheet and alternately extending outwardly from the sheet on opposite sides thereof.

14. The invention defined in claim 13, wherein the insulating arrangement comprises a plurality of the sheets of material arranged so that the protrusions of at least some of the sheets abut protrusions of adjacent sheets on opposite sides of the at least some of the sheets.

15. The invention defined in claim 14, wherein at least some of the plurality of sheets comprise successive portions of a single sheet repeatedly folded over itself.

16. The invention defined in claim 14, wherein the sheets are mounted so as to be generally concentric relative to the center of a circle and the corrugations of the sheets are spaced-apart by varying distances which increase with distance from the center of the circle so as to dispose the corrugations of the various sheets in common radial planes extending outwardly from the center of the circle.

17. The invention defined in claim 13, wherein the protrusions of each corrugation alternate in direction along the sheet to define a zig-zag pattern.

18. An insulator comprising a plurality of thin metal sheets disposed in spaced-apart, concentric relation and arranged to form a circumferential portion of a hollow cylinder, and including metal sheet means for joining with opposite outer ones of the thin metal sheets to form a sealed envelope surrounding the inner thin metal sheets therebetween, each of the inner thin metal sheets having a plurality of corrugations therein which are spaced-apart, generally parallel with each other, and extend in directions parallel to a central axis of the hollow cylinder, each of the corrugations being disposed within a common radial plane of the hollow cylinder together with a corrugation of each of the other inner thin metal sheets, each of the corrugations extending on opposite sides of the thin metal sheet into contact with corrugations of the metal sheets on opposite sides thereof, whereby the inner thin metal sheets are supported within the envelope and nominal intersheets gaps between adjacent pairs of the thin metal sheets are maintained.

19. The invention defined in claim 18, wherein each contact of a corrugation with corrugations of the metal sheets on opposite sides thereof is substantially a point contact.

20. The invention defined in claim 18, wherein the corrugations are V-shaped in cross-section.

21. The invention defined in claiam 18, wherein the intersheet gaps between adjacent pairs of the thin metal sheets are nominally of a size substantially less than 1/2 inch.

* * * * *

UNITED STATES PATENT AND TRADEMARK OFFICE
CERTIFICATE OF CORRECTION

PATENT NO. : 3,981,689
DATED : September 21, 1976
INVENTOR(S) : Robert B. Trelease It is certified that error appears in the above-identified patent and that said Letters Patent are hereby corrected as shown below:

Column 3, line 13, after "fittable" and before "to", "togethe" should read --together--. Column 4, line 33, after "example", "a" should read --as--; line 58, last column of Table, "object" should read --object)--. Column 6, line 7, after "convection", "beings" should read --begins--. Column 7, second column of Table, "Inches" should read --(Inches)--. Column 8, line 45, after "is", "foled" should read --folded--. Column 9, line 1, after "an", "ajacent" should read --adjacent--. Column 10, line 64, "claiam" should read --claim--.

Signed and Sealed this

Twenty-first Day of December 1976

[SEAL]

Attest:

RUTH C. MASON
*Attesting Officer*

C. MARSHALL DANN
*Commissioner of Patents and Trademarks*